US010119678B2

(12) United States Patent
Shikata et al.

(10) Patent No.: US 10,119,678 B2
(45) Date of Patent: Nov. 6, 2018

(54) LIGHTING FIXTURE

(71) Applicant: Stanley Electric Co., Ltd., Tokyo (JP)

(72) Inventors: Satoshi Shikata, Tokyo (JP); Shota Nishimura, Tokyo (JP); Hidetaka Okada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 24 days.

(21) Appl. No.: 15/224,170

(22) Filed: Jul. 29, 2016

(65) Prior Publication Data

US 2017/0038022 A1 Feb. 9, 2017

(30) Foreign Application Priority Data

Aug. 3, 2015 (JP) ................................ 2015-153613

(51) Int. Cl.

| | |
|---|---|
| ***B60Q 1/00*** | (2006.01) |
| ***F21S 8/10*** | (2006.01) |
| ***F21S 45/47*** | (2018.01) |
| ***F21S 41/143*** | (2018.01) |
| ***F21S 41/29*** | (2018.01) |
| ***F21S 41/20*** | (2018.01) |
| ***F21S 41/24*** | (2018.01) |
| ***F21S 41/255*** | (2018.01) |
| ***F21S 41/32*** | (2018.01) |
| *F21Y 115/10* | (2016.01) |

(52) U.S. Cl.

CPC .......... *F21S 48/328* (2013.01); *F21S 41/143* (2018.01); *F21S 41/24* (2018.01); *F21S 41/255* (2018.01); *F21S 41/285* (2018.01); *F21S 41/295* (2018.01); *F21S 41/321* (2018.01); *F21S 41/322* (2018.01); *F21S 45/47* (2018.01); *F21Y 2115/10* (2016.08)

(58) Field of Classification Search

CPC ..... F21S 48/24; F21S 48/1154; F21S 48/1216
USPC .................................................. 362/538–539
See application file for complete search history.

(56) References Cited

U.S. PATENT DOCUMENTS 6,220,736 B1 * 4/2001 Dobler ................ F21S 48/1233 359/742
2015/0085515 A1 * 3/2015 Lee .................... F21S 48/1225 362/539

FOREIGN PATENT DOCUMENTS

JP 2008-78034 A 4/2008

* cited by examiner

*Primary Examiner* — Sean Gramling
(74) *Attorney, Agent, or Firm* — Kenealy Vaidya LLP

(57) ABSTRACT

A lighting fixture projects light sideward and has no restriction in design. The lighting fixture can include an LED; a primary lens disposed in an optical axis of the LED, the primary lens being configured to form a main light distribution; an auxiliary lens disposed on an outer peripheral side of the primary lens around the optical axis of the LED; and a reflecting portion configured to reflect part of light emitted from the LED to substantially an entire area of the auxiliary lens on an inner peripheral surface side thereof. The reflecting portion can be formed integrally with the primary lens and include an incident surface on which part of light emitted from the LED can be incident, a reflecting surface configured to reflect light having entered through the incident surface, and a light-exiting surface configured to allow the light reflected by the reflecting surface to exit.

19 Claims, 4 Drawing Sheets

LIGHTING FIXTURE

This application claims the priority benefit under 35 U.S.C. § 119 of Japanese Patent Application No. 2015-153613 filed on Aug. 3, 2015, which is hereby incorporated in its entirety by reference.

TECHNICAL FIELD

The presently disclosed subject matter relates to a lighting fixture having a main lens configured to form a main light distribution pattern and an auxiliary lens disposed on an outer peripheral side of the main lens.

BACKGROUND ART

Some vehicle lighting fixtures can include a light distribution controlling lens configured to control light distribution of light emitted from a light source within a range specified by a desired light distribution standard in order to satisfy such a desired light distribution standard. Furthermore, in order to improve the light utilization efficiency, a configuration illustrated in FIG. 1 is proposed, for example, in Japanese Patent Application Laid-Open No. 2008-078034.

FIG. 1 is a longitudinal cross-sectional view of a vehicle lighting fixture 101 proposed in Japanese Patent Application Laid-Open No. 2008-078034. As illustrated, the vehicle lighting fixture 101 can include an LED 103 serving as a light source and mounted on a flexible substrate 102, and a light distribution controlling lens 104 disposed so that the center thereof is coincident with an optical axis x of the LED 103. The vehicle lighting fixture 101 can further include a cup-shaped light guiding lens 105 around the light distribution controlling lens 104 so that the light guiding lens 105 surrounds the light distribution controlling lens 104. Note that the flexible substrate 102 on which the LED 103 is mounted can be fixed to a heat sink 106 for heat dissipation use.

In the vehicle lighting fixture 101 with the above-described configuration, when the LED 103 is supplied with a current to emit light, the light can enter the light distribution controlling lens 104, and parts L1 and L2 of light rays entering the light distribution controlling lens 104 can be projected through the light emitting surface of the light distribution controlling lens 104 within a range of a desired light distribution standard. The remaining part L3 of light rays, i.e., the light rays emitted by a larger angle with respect to the optical axis x and projected outside the range of the desired light distribution standard in a conventional case, can enter the light guiding lens 105 and travels within the light guiding lens 105 while being repeatedly totally reflected by the same. As a result, the remaining part L3 of light rays can also be projected from the tip end of the light guiding lens 105 within the range of the desired light distribution standard. This means that the conventionally unused light rays L3 can be effectively utilized, so that the light utilization efficiency of light emitted from the LED 103 can be improved.

However, the vehicle lighting fixture 101 proposed in Japanese Patent Application Laid-Open No. 2008-078034 illustrated in FIG. 1 has problems in which the light cannot be projected in a sideward direction (peripheral direction), and the design of the light emitting surface is limited due to the curved light guiding lens 105 (such a curved shape is prerequisite for the light guiding lens 105).

SUMMARY

The presently disclosed subject matter was devised in view of these and other problems and features in association with the conventional art. According to an aspect of the presently disclosed subject matter, a lighting fixture can project light in a sideward direction (peripheral direction) and have no restriction in the design of the light emitting surface.

According to another aspect of the presently disclosed subject matter, a lighting fixture can include a light source having an optical axis; a first lens, or a primary lens, disposed in a direction of the optical axis of the light source, the first lens being configured to form a first light distribution (main light distribution); a second lens, or an auxiliary lens, disposed on an outer peripheral side of the first lens around the optical axis of the light source as a center; and a reflecting portion configured to reflect part of light emitted from the light source to substantially an entire area of the second lens on an inner peripheral surface side thereof.

The lighting fixture with the above-described configuration can further include a projection lens disposed on the optical axis and in front of the first lens, and the second lens can be disposed between the projection lens and the light source.

In the lighting fixture with any of the above-described first and second configurations, the reflecting portion can be formed integrally with the first lens and configured to include an incident surface on which part of the light emitted from the light source can be incident, a reflecting surface configured to reflect light having entered through the incident surface, and a light-exiting surface configured to allow the light having been reflected by the reflecting surface to exit.

The lighting fixture with any of the above-described first and second configurations can further include a heat sink configured to cool the light source and a reflecting surface formed therein, the reflecting surface serving as the reflecting portion. Alternatively, the lighting fixture with any of the above-described first and second configurations can further include a reflector provided separately from the first lens, the reflector serving as the reflecting portion.

In the lighting fixture with any of the above-described configurations, the light source can emit light with a high intensity closer to the optical axis and the reflecting portion can be configured to reflect the light with the high intensity toward the second lens on a farther side with respect to the light source.

In the lighting fixture with any of the above-described configurations, the second lens can have an inner surface and an outer surface at least one of which is subjected to a light diffusion treatment.

According to the presently disclosed subject matter, part of light emitted from the light source can be reflected by the reflecting portion to substantially the entire area of the second lens, and thus, the entire second lens disposed on the outer peripheral side of the first lens around the optical axis of the light source as a center can be irradiated with light (can project the light uniformly through the second lens), meaning that the light emission can be available in a sideward direction (outer peripheral direction) of the lighting fixture. In this case, since the light from the light source, which has conventionally been unused, can be used for sideward light emission from the lighting fixture, resulting in improved light utilization efficiency of the light emitted from the light source. Furthermore, the light guiding lens with restricted shape is not used, the lighting fixture is not limited in terms of the design of the light emitting surface.

Further, when the lighting fixture is configured to have the reflecting portion that can reflect the high intensity light closer to the optical axis to the second lens on the farther side with respect to the light source, the intensity of the light reaching the second lens can be uniformed across the entire area of the second lens. Thus, the entire second lens can be uniformly irradiated with light.

Furthermore, when at least one of the inner and outer surfaces of the second lens have been subjected to a light diffusion treatment, the light reaching the second lens can be diffused by the second lens, so that the entire second lens can be observed to uniformly emit light.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to lighting fixtures of the presently disclosed subject matter with reference to the accompanying drawings in accordance with exemplary embodiments.

<First Exemplary Embodiment>

Figure 1:
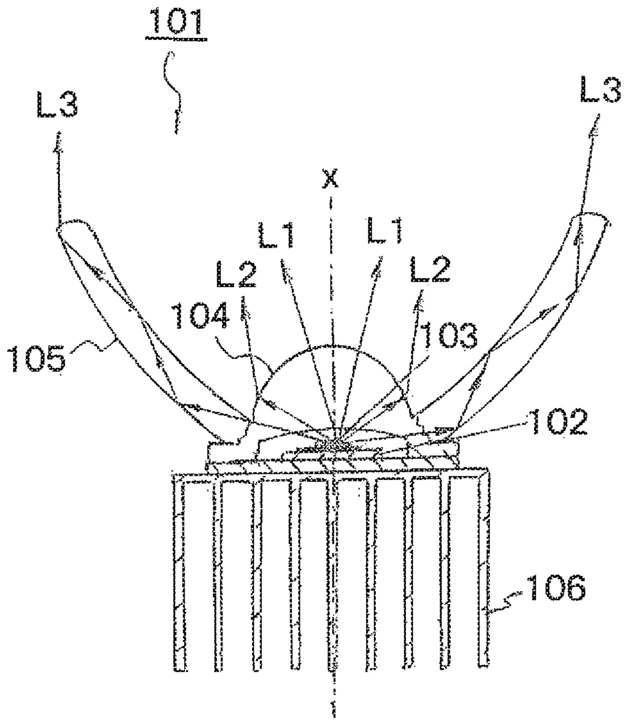
FIG. 1 Conventional Art
FIG. 1 is a cross-sectional view of a vehicle lighting fixture proposed in Japanese Patent Application Laid-Open No. 2008-078034.
Figure 2:
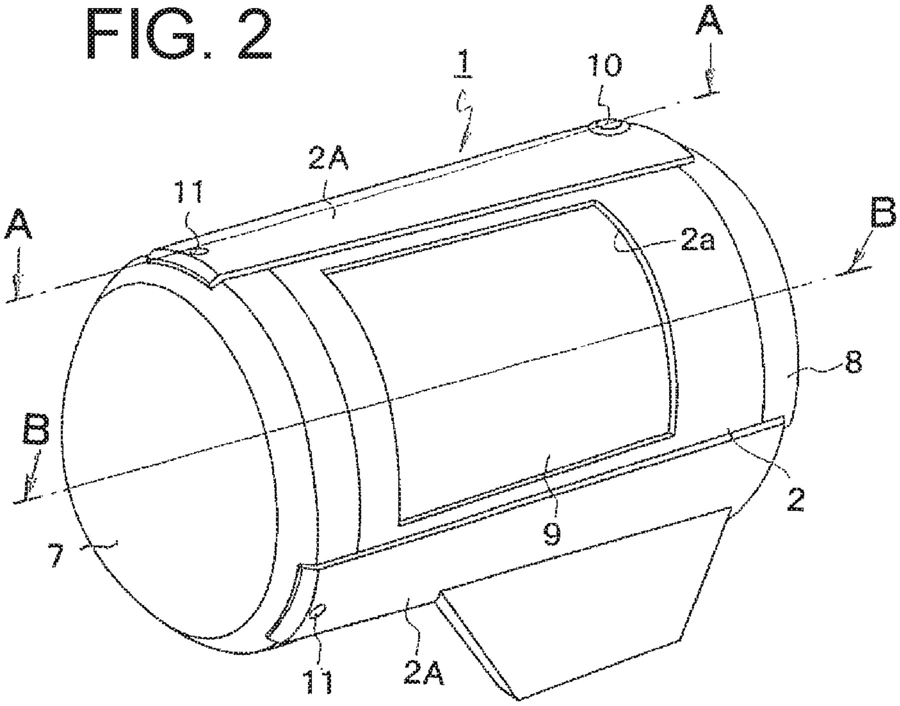
FIG. 2 is a perspective view of a lighting fixture of a first exemplary embodiment made in accordance with principles of the presently disclosed subject matter.
Figure 3:
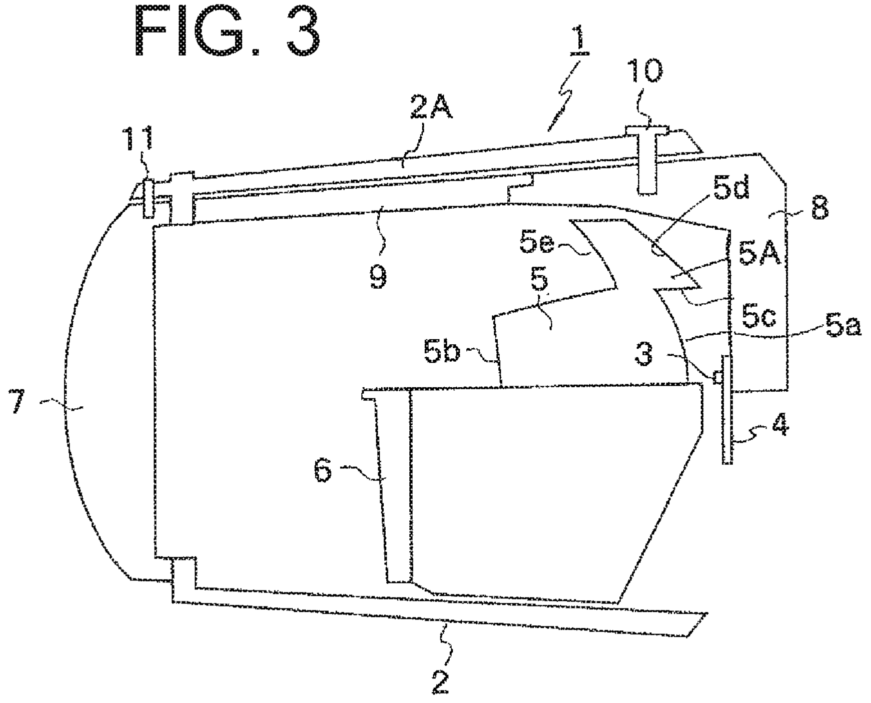
FIG. 3 is a cross-sectional view of the vehicle lighting fixture taken along line A-A in FIG. 2.
Figure 4:
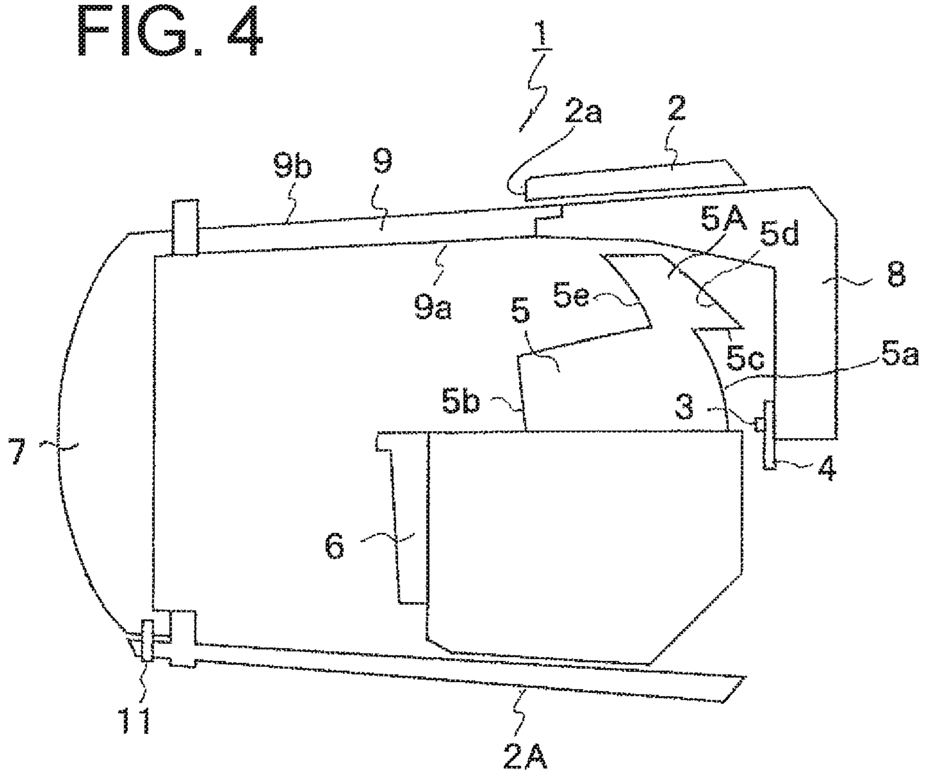
FIG. 4 is a cross-sectional view of the vehicle lighting fixture taken along line B-B in FIG. 2.
Figure 5:
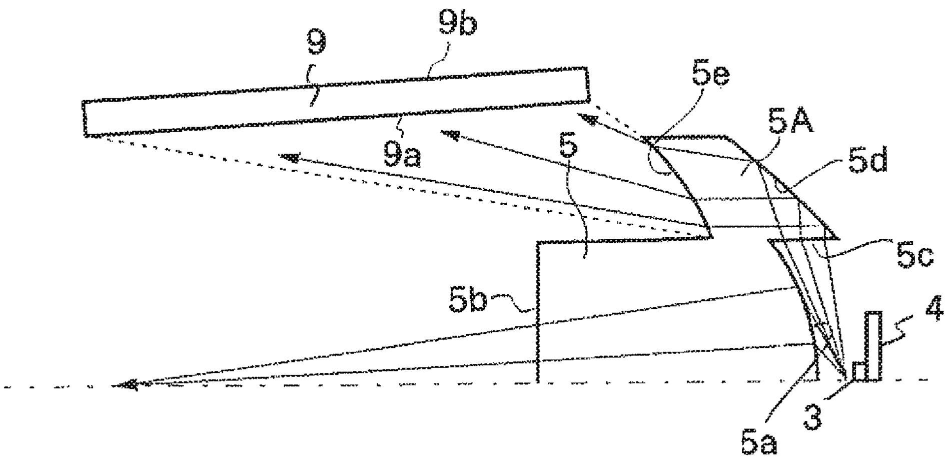
FIG. 5 is a cross-sectional partial view illustrating an essential portion of the lighting fixture according to the first exemplary embodiment.

FIG. 2 is a perspective view of a lighting fixture of a first exemplary embodiment made in accordance with principles of the presently disclosed subject matter, FIG. 3 is a cross-sectional view of the vehicle lighting fixture taken along line A-A in FIG. 2, FIG. 4 is a cross-sectional view of the vehicle lighting fixture taken along line B-B in FIG. 2, and FIG. 5 is a cross-sectional partial view illustrating an essential portion of the lighting fixture according to the first exemplary embodiment.

The lighting fixture 1 according to this exemplary embodiment can be used as a headlamp to be disposed on left and right front portions of a vehicle body. As illustrated in FIGS. 3 and 4, the lighting fixture 1 can include a substantially cylindrical frame 2, and a light emitting diode (LED) 3 serving as a light source, a substrate 4 on which the LED 3 is mounted, a primary lens 5, and a shade 6, which are accommodated in the frame 2.

The frame 2 can have a front opening (in FIGS. 3 and 4, the left side corresponds to the front side). A projection lens 7 can be attached to cover the front opening of the frame 2. The frame 2 can further have a rear opening, to which a heat sink can be attached to cover the rear opening. The frame 2 can further have rectangular windows 2*a* on both sides (only one of them is illustrated in FIG. 2), and an auxiliary lens 9 can be attached to cover each of the rectangular windows 2*a*.

The frame 2 can further include stays 2A extending in a front-rear direction at three positions in a peripheral direction of the frame 2. FIG. 2 shows two out of the three stays 2A. The heat sink 8 can be attached to the rear end of the stay 2A with a bolt 10. The heat sink 8 can be formed of die-casting aluminum with high heat dissipation properties, and have a vertically extending inner portion, to part of which the substrate 4 is vertically attached. The LED 3 can be mounted on the substrate 4 so that the optical axis of the LED 3 is directed in the front-rear direction.

The projection lens 7 can be attached to the front ends of the three stays 2A by press-fit pins 11 inserted thereinto to cover the front opening of the frame 2.

The primary lens 5 can be disposed in the optical axis direction of the LED 3 and configured to form a main light distribution. The primary lens 5 can include an incident surface 5*a* and a planar light-exiting surface 5*b*. The incident surface 5*a* can have a convex curved shape and face to the LED 3. Furthermore, the primary lens 5 can further include a reflecting portion 5A integrally formed therewith.

The reflecting portion 5A can reflect part of the light emitted from the LED 3 (in particular, weak light out of the range of a half-value angle) toward the substantially entire area of the auxiliary lens 9. The reflecting portion 5A can include a planar incident surface 5*c* on which part of the light emitted from the LED 3 can be incident, a concave reflecting surface 5*d* configured to reflect the light that has entered through the incident surface 5*c* to the auxiliary lens 9, and a concave light-exiting surface 5*e* through which the light having been reflected by the reflecting surface 5*d* exits toward the auxiliary lens 9.

The auxiliary lens 9 can be molded to have a rectangular arc-like curved shape, and disposed around the optical axis of the LED 3 as a center at two locations in the peripheral direction of the main lens 5 (on both sides thereof). The auxiliary lens 9 can have an inner incident surface 9*a* and an outer light-exiting surface 9*b*, at least one of which can be subjected to a light diffusion treatment such as formation of cuts or embossing.

In the lighting fixture 1 with the above-described configuration, when the LED 3 serving as the light source is supplied with a current to emit light, the light with a high intensity (strong light) within the half value angle emitted from the LED 3 can be incident on the incident surface 5*a* of the primary lens 5 to exit through the light-exiting surface 5*b* forward as illustrated in FIG. 5. At that time, the light can be refracted by the incident surface 5*a* to form the desired main light distribution. Part of the exiting light from the primary lens 5 can be shielded by the shade 6 and remaining part of the light can be projected forward through the projection lens 7, so that the lighting fixture 1 can function as a headlamp.

The light with a low intensity (weak light) outside of the half value angle emitted from the LED 3 can be incident on the incident surface 5*c* of the reflecting portion 5A integrally formed with the primary lens 5 to enter the reflecting portion 5A, and then reflected by the reflecting surface 5*d* to be directed to the light-exiting surface 5*e*. The light reflected by the reflecting surface 5*d* can be refracted by the light-exiting surface 5*e* of the reflecting portion 5A to be directed to the auxiliary lens 9. Then, the light can be incident on the incident surface 9*a* of the auxiliary lens 9 to exit through the light-exiting surface 9*b*. In this manner, the light can be projected from the auxiliary lens 9 (the auxiliary lens 9 can be irradiated with the light), meaning that the light can be emitted from the side surface of the lighting fixture 1. Here, the reflecting surface 5*d* of the reflecting portion 5A can be designed to reflect part of the light with the high intensity closer to the optical axis of the LED 3 toward the auxiliary lens 9 on a farther side with respect to the LED 3. The intensity of the light reaching the auxiliary lens 9 can be uniformed across the entire area of the auxiliary lens 9. Thus, the entire auxiliary lens 9 can be uniformly irradiated with light. In this exemplary embodiment, since at least one of the incident surface 9*a* and the light-exiting surface 9*b* of the auxiliary lens 9 has been subjected to a light diffusion treatment, the light reaching the auxiliary lens 9 can be diffused by the auxiliary lens 9, to thereby exit uniformly from the entire auxiliary lens 9 (the auxiliary lens 9 can project light uniformly across the entire area thereof).

As described above, part of light emitted from the LED 3 can be reflected by the reflecting portion 5A, which is integrally formed with the main lens 5, to substantially the entire area of the auxiliary lens 9, and thus, the entire auxiliary lens 9 disposed on the outer peripheral side of the primary lens 5 around the optical axis of the LED 3 as a center can be irradiated with light (can project light uniformly), meaning that the light emission can be available in the sideward direction (outer peripheral direction) of the lighting fixture 1. In this case, since the light from the LED 3, which has conventionally been unused, can be used for sideward light emission from the lighting fixture 1, the light utilization efficiency of the light emitted from the LED 3 can be enhanced. Furthermore, any light guiding lens with restricted shape is not used, the lighting fixture 1 is not restricted in terms of the design of the light emitting surface.

<Second Exemplary Embodiment>

A description will now be given of a second exemplary embodiment with reference to FIG. 6.

Figure 6:
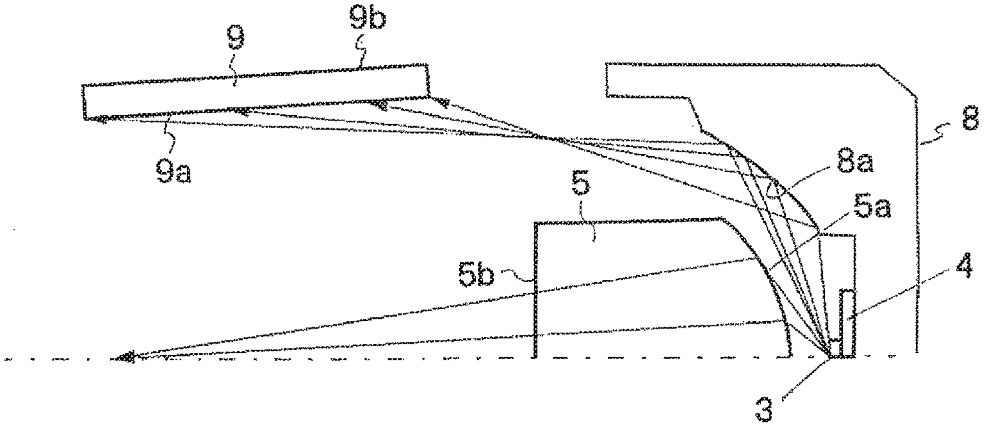
FIG. 6 is a cross-sectional partial view illustrating an essential portion of a lighting fixture of a second exemplary embodiment made in accordance with the principles of the presently disclosed subject matter.

FIG. 6 is a cross-sectional partial view illustrating an essential portion of a lighting fixture of the second exemplary embodiment made in accordance with the principles of the presently disclosed subject matter. In the drawing, the same components as those illustrated in FIG. 5 are denoted by the same reference numerals, and redundant descriptions thereof will be omitted as appropriate.

In this exemplary embodiment, the reflecting portion configured to reflect the light from the LED 3 toward the auxiliary lens 9 can be provided to the heat sink 8. Specifically, the heat sink 8 can include a concave reflecting surface 8*a* formed therein, which can serves as the reflecting portion. The other components can be the same as those of the first exemplary embodiment.

With this configuration, part of light emitted from the LED 3 can be reflected by the reflecting surface 8*a* of the heat sink 8, serving as the reflecting portion, to substantially the entire area of the auxiliary lens 9, and thus, the entire auxiliary lens 9 disposed on the outer peripheral side of the primary lens 5 around the optical axis of the LED 3 as a center can be irradiated with light (can project light uniformly), meaning that the light emission can be available in the sideward direction (outer peripheral direction) of the lighting fixture 1.

<Third Exemplary Embodiment>

A description will now be given of a third exemplary embodiment with reference to FIG. 7.

Figure 7:
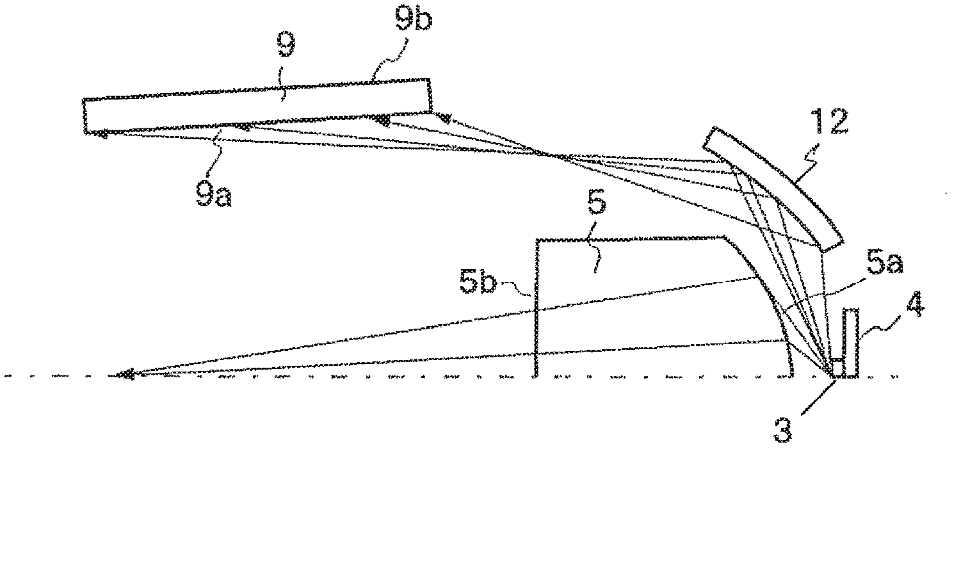
FIG. 7 is a cross-sectional partial view illustrating an essential portion of a lighting fixture of a third exemplary embodiment made in accordance with the principles of the presently disclosed subject matter.

FIG. 7 is a cross-sectional partial view illustrating an essential portion of a lighting fixture of the third exemplary embodiment made in accordance with the principles of the presently disclosed subject matter. In the drawing, the same components as those illustrated in FIG. 5 are denoted by the same reference numerals, and redundant descriptions thereof may be omitted as appropriate.

In this exemplary embodiment, the reflecting portion configured to reflect the light from the LED 3 toward the auxiliary lens 9 can be provided as a reflector 12 separately from the main lens 5. The other components can be the same as those of the first exemplary embodiment.

With this configuration, part of light emitted from the LED 3 can be reflected by the reflector 12 to substantially the entire area of the auxiliary lens 9, and thus, the entire auxiliary lens 9 disposed on the outer peripheral side of the primary lens 5 around the optical axis of the LED 3 as a center can be irradiated with light (can project light uniformly), meaning that the light emission can be available in the sideward direction (outer peripheral direction) of the lighting fixture 1.

The lighting fixture made in accordance with the principles of the presently disclosed subject matter can be applied not only to a vehicular headlamp but also to various vehicular lighting fixtures other than a headlamp, various illumination devices, and any optional lighting fixtures. Furthermore, the light source can adopt not only an LED but also any light sources including a bulb.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting fixture comprising:

a light source having an optical axis;

a first lens disposed on the optical axis of the light source, the first lens being configured to form a first light distribution;

a second lens disposed on an outer peripheral side of the first lens around the optical axis of the light source as a center;

a reflecting portion configured to reflect part of light emitted from the light source to substantially an entire area of the second lens on an inner peripheral surface side thereof; and a projection lens disposed on the optical axis and in front of the first lens and the second lens.

2. The lighting fixture according to claim 1, wherein the reflecting portion is formed integrally with the first lens and configured to include an incident surface on which part of the light emitted from the light source can be incident, a reflecting surface configured to reflect light having entered through the incident surface, and a light-exiting surface configured to allow the light having been reflected by the reflecting surface to exit.

3. The lighting fixture according to claim 1, comprising a heat sink configured to cool the light source and include a reflecting surface formed therein, the reflecting surface serving as the reflecting portion.

4. The lighting fixture according to claim 1, comprising a reflector provided separately from the first lens, the reflector serving as the reflecting portion.

5. The lighting fixture according to claim 1, wherein the light source emits light with a high intensity closer to the optical axis and the reflecting portion is configured to reflect the light with the high intensity toward the second lens on a farther side with respect to the light source.

6. The lighting fixture according to claim 2, wherein the light source emits light with a high intensity closer to the optical axis and the reflecting portion is configured to reflect the light with the high intensity toward the second lens on a farther side with respect to the light source.

7. The lighting fixture according to claim 3, wherein the light source emits light with a high intensity closer to the optical axis and the reflecting portion is configured to reflect the light with the high intensity toward the second lens on a farther side with respect to the light source.

8. The lighting fixture according to claim 4, wherein the light source emits light with a high intensity closer to the optical axis and the reflecting portion is configured to reflect the light with the high intensity toward the second lens on a farther side with respect to the light source.

9. The lighting fixture according to claim 1, wherein the second lens has an inner surface and an outer surface at least one of which is subjected to a light diffusion treatment.

10. The lighting fixture according to claim 2, wherein the second lens has an inner surface and an outer surface at least one of which is subjected to a light diffusion treatment.

11. The lighting fixture according to claim 3, wherein the second lens has an inner surface and an outer surface at least one of which is subjected to a light diffusion treatment.

12. The lighting fixture according to claim 4, wherein the second lens has an inner surface and an outer surface at least one of which is subjected to a light diffusion treatment.

13. The lighting fixture according to claim 5, wherein the second lens has an inner surface and an outer surface at least one of which is subjected to a light diffusion treatment.

14. The lighting fixture according to claim 7, wherein the second lens has an inner surface and an outer surface at least one of which is subjected to a light diffusion treatment.

15. The lighting fixture according to claim 1, wherein light emitted from the light source passes the first lens and the projection lens, which are disposed on the optical axis of the light source, to form the first light distribution as a main light distribution.

16. The lighting fixture according to claim 3, wherein light emitted from the light source passes the first lens and the projection lens, which are disposed on the optical axis of the light source, to form the first light distribution as a main light distribution.

17. The lighting fixture according to claim 4, wherein light emitted from the light source passes the first lens and the projection lens, which are disposed on the optical axis of the light source, to form the first light distribution as a main light distribution.

18. The lighting fixture according to claim 7, wherein light emitted from the light source passes the first lens and the projection lens, which are disposed on the optical axis of the light source, to form the first light distribution as a main light distribution.

19. The lighting fixture according to claim 8, wherein light emitted from the light source passes the first lens and the projection lens, which are disposed on the optical axis of the light source, to form the first light distribution as a main light distribution.

* * * * *